United States Patent [19]
Pougue

[11] 3,763,788
[45] Oct. 9, 1973

[54] MAGNETIC SWITCHING OF VEHICLES
[75] Inventor: Lonnie C. Pougue, Chula Vista, Calif.
[73] Assignee: Rohr Corporation, Chula Vista, Calif.
[22] Filed: Aug. 17, 1971
[21] Appl. No.: 172,491

[52] U.S. Cl.... 104/130, 104/148 LM, 104/148 MS, 104/138 R
[51] Int. Cl............................................ E01b 25/26
[58] Field of Search ................ 104/89, 91, 96, 105, 104/118, 119, 130, 134, 148 MS, 148 LM; 105/141, 144, 148

[56] References Cited
UNITED STATES PATENTS
3,541,964 11/1970 Harbert.................................. 104/91
3,158,765 11/1964 Polgreen ...................... 104/148 MS
3,669,026 6/1972 Mouritzen....................... 104/138 R
FOREIGN PATENTS OR APPLICATIONS
707,032 5/1946 Germany ............................ 104/130

Primary Examiner—Gerald M. Forlenza
Assistant Examiner—D. W. Keen
Attorney—George E. Pearson

[57] ABSTRACT

A system for switching a high speed captive surface vehicle from a primary guideway to a secondary guideway by magnetic attraction means. The vehicle carries on its sides controllable electro-magnetic force fields that cause the vehicle to be magnetically attracted to without touching corresponding ferromagnetic guidance rails along the guideways. When switching is required, the magnetic force field on the side of the moving vehicle opposite from the side of an arcuate secondary guideway intersection is de-energized allowing the vehicle under control of the remaining energized force field to follow the guide rail of the secondary guideway. When the vehicle clears the intersection, the de-energized force field is then re-activated thus completing the switching maneuver to resume normal guidance control along the secondary guideway.

4 Claims, 6 Drawing Figures

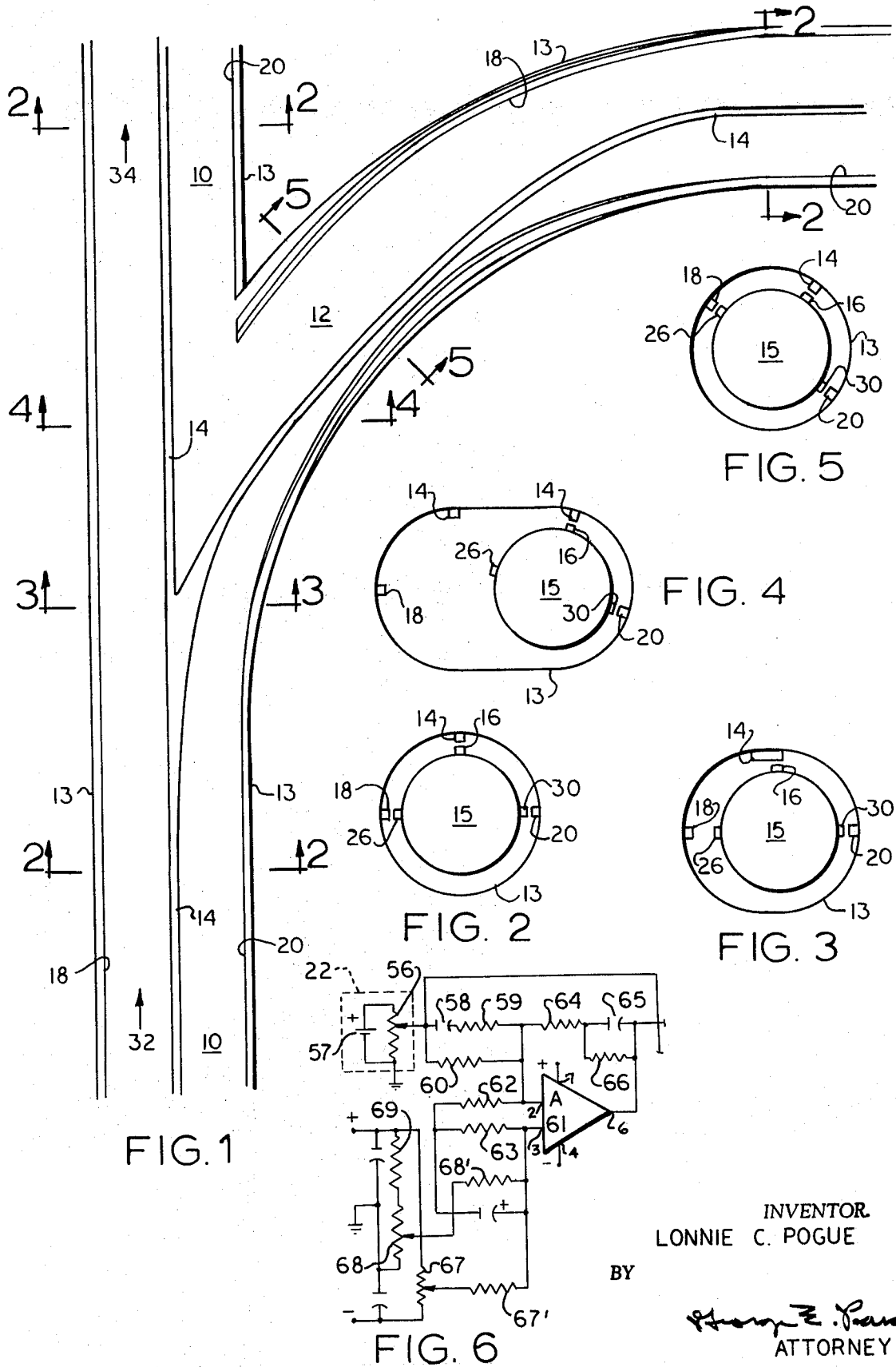
PATENTED OCT 9 1973   3,763,788
INVENTOR
LONNIE C. POGUE
ATTORNEY

MAGNETIC SWITCHING OF VEHICLES

BACKGROUND OF THE INVENTION

The switching of trains and similar track guided vehicles from a first guideway to a second guideway is known in the art and has been successfully accomplished by various mechanical switching means. In the field of conventional rail transportation systems, for example, switching is accomplished by physical translation of the main rail system in a manner that directs a moving vehicle to an auxiliary rail system. In this type of system the vehicle is guided as well as supported by a wheel rail system.

There are other systems, such as disclosed in U.S. Pat. No. 1,625,501 issued to William H. Robertson. This patent teaches a conventional wheel rail guidance support system as described above and in addition provides for an auxiliary set of wheels carried by the vehicle that have no physical contact with guide rails except at switch points. At switch points an additional set of rails is provided. Upon reaching a desired switch point the auxiliary wheels are lowered for engagement with the auxiliary rails, and when engagement is completed the main guide and support wheels are then raised at a level above track contact. When the switching is completed, the main wheels are then placed in their normal main rail contact position and the auxiliary wheels are again raised out of the range of auxiliary rail contact.

U.S. Pat. No. 3,403,634 issued to W. K. Crowder teaches a track-wheel vehicle guidance and support system having an overhead inverted "U" channel that is selectively engaged by a switch arm cammed by the vehicle for steering the vehicle from a main rail to a subordinate rail. U.S. Pat. No. 3,340,822 to L. M. F. Delasalle teaches switching means for air cushion vehicles. Again, as discussed above the method employs rail and pinch wheel drive means. The center drive rail is lowered flush with the guideway as auxiliary drive wheels engage indentations along the guideway that steer the vehicle from the main guideway to an auxiliary guideway.

The switching methods described have common disadvantages: they require moving mechanical parts to execute switching; the vehicle to be switched must have some physical contact with its guideway means; and auxiliary switching hardware adds considerable expense to railway construction.

It is obvious that a switching method having no moving mechanical parts for failure, no physical contact with its guideway means and which is inexpensive to install or maintain would be highly desirable.

SUMMARY OF THE INVENTION

This invention relates to a new and novel switching system and method for switching a high speed captive vehicle without requiring physical contact of any of its switching elements with their guideway counterparts. As hereinafter more fully disclosed this is accomplished by magnetic attraction.

The switching system and method may be used advantageously with various types of guided vehicle systems such as those employing air cushion, air bearing, magnetic, or wheel supports for suspension and/or guidance.

Accordingly, this invention is to provide a switching system for guiding and switching vehicles along a guideway wherein the switching system does not employ mechanical moving parts.

Another purpose of this invention is to provide a switching system wherein the switching means as well as the propulsion system has no physical contact with the trackway along which the vehicle is moved and switched.

Still another purpose is to adapt the operating principles of the magnetic suspension and propulsion system of the vehicle to provide an active guidance and switching system for guiding, or guiding and propelling, the vehicle along its main trackway, or selectively switching the vehicle to a branch trackway.

A further purpose of this invention is to provide a novel switching system that is less expensive than present constructions and arrangements employed for the purpose and that requires considerably less maintenance.

The foregoing and various other features of the invention will appear in the course of the description which is rendered below with reference to the accompanying drawings.

BRIEF DESCRIPTION OF THE DRAWINGS

FIG. 1 is a schematic plan view of a primary guideway and secondary guideway including a showing of the arcuate entrance to the secondary guideway and the magnetic suspension rails.

FIG. 2 is a sectional view of the straight portion of the primary guideway taken along the line 2—2 of FIG. 1 and showing the tunnel configuration therewith.

FIG. 3 is a sectional view of the intersection of the primary guideway and the secondary guide rail taken along the line 3—3 of FIG. 1 and showing the change in the tunnel configuration at the intersection.

FIG. 4 is a sectional view of that portion of the intersection including both the primary and secondary guideways taken along the line 4—4 of FIG. 1 and showing the broadening of the tunnel to accommodate both guideways and also illustrating the beginning of vehicle banking.

FIG. 5 is a sectional view of a portion of the secondary guideway taken along line 5—5 of FIG. 1 and showing the increased banking of the vehicle.

FIG. 6 is a diagrammatic view of a portion of the control circuit employed for guidance.

DETAILED DESCRIPTION

Referring to FIG. 1, primary guideway 10 and secondary guideway 12, branching off from guideway 10, are shown. This guideway system may be an open system running on or above the surface or in a tunnel. The guideways 10 and 12, according to the preferred embodiment of the invention, are shown in FIGS. 2 to 5 as comprising a trackway which also employs a tunnel 13 evacuated to an equivalent pressure of an altitude of 300,000 feet. Tunnel 13 is generally circular in cross-sectional configuration as shown by in various figures 2 to 5 hereinafter to be described.

Tunnel 13, at the top thereof, as seen in FIGS. 2 to 5, is provided with a suspension rail 14 generally constructed of ferro magnetic material for magnetic suspension and propulsion of the vehicle 15 by attractive forces between the moving electromagnetic force field of the vehicle and the suspension rail 14. Physical contact between the moving electromagnetic force field 16 and the rail 14 is prevented by suspension control means disclosed and claimed in the copending application of J. A. Ross for "Magnetic Suspension and Propulsion System," Ser. No. 131,041, filed Apr. 19, 1971, and assigned to the assignee of the instant application, now U. S. Pat. No. 3,638,093. Details of the suspension control means are incorporated into this application by reference to the aforesaid application of J. A. Ross. Guidance rails are provided on the opposite sides of the tunnel 13, these being identified in all figures as 18 and 20. These rails, similarly to suspension rail 14, are also constructed of ferro magnetic material and react with vehicle carried guidance force fields provided by electromagnets shown in FIGS. 2 to 5 as 26 and 30.

The system for guidance, like the suspension system, employs attractive magnetic forces wherein there is never physical contact between the guide rails 18, 20 and their vehicle counterparts 26, 30 respectively. Each rail-force field space relationship is controlled by the control circuit described in the co-pending J. Ross application as hereinbefore mentioned. It should be noted, referring to FIG. 6, that although the principals discussed in that application included the effect of gravity on the suspended mass and the instant invention does not include gravitational forces. Accordingly, the Ross control circuit is adjusted to remove gravity as a control factor in the circuit. This is accomplished by making a minor adjustment to the reference input signal to his amplifier 61 at terminal 3 by adjusting resistor 67 in a manner to provide a reference voltage that is equal to the signal voltage applied at terminal 2 of the same amplifier from his displacement sensor 56, all substantially in the manner as shown in FIG. 6. This voltage adjustment is made when the vehicle force fields are equally spaced from the two guide rails wherein the effective voltage is in the neighborhood of zero. As shown by FIGS. 4 and 5 of this specification, the suspension rail 14 and the guidance rails 18 and 20 are progressively rotated or banked to the same degree toward the center of the arc of direction through the length of the arcuate portion of secondary guideway 12 entrance reaching a maximum bank at one half way through the length then progressively reversing the vehicle bank in a like manner through the last one half of the entrance length again reaching a horizontal plane as shown in FIG. 2 when the guideway 12 again becomes straight.

OPERATION

A high speed vehicle 15 having a weight of the order of fifty tons is normally traveling along primary guideway 10 in the direction of the arrow 32. In an operational evacuated tunnel system, as hereinbefore mentioned, speeds of 2000 miles per hour for vehicle travel along the straight portion of the trackway are anticipated and the same or a somewhat reduced speed is anticipated for switching from a main trackway to an auxiliary trackway. It should be kept in mind that a mass, such as the vehicle mentioned weighing fifty tons, traveling at this speed has tremendous momentum forces existing that help to maintain its present direction of travel. When the direction of travel of a vehicle of this weight range is changed by 90°, at the aforementioned speed, in a manner so as not to impose more than 0.1 g of lateral acceleration, which is desirable to maintain passenger comfort, a turning radius of 500 miles is required. Because of this fact, for practical purposes the vehicle may be slowed considerably before switching where radii as mentioned above are not practical.

When switching is desired, source power, not shown, supplying the force field 26 and its associated control circuit is removed prior to entering the secondary guideway 12 rendering the control system and associated magnetic forces on this side of the vehicle inactive. Thus any displacement of the vehicle from guide rail 18 will not be corrected for, keeping in mind, however, that force field 30 is still active and will continue to be responsive to any vehicle space variation from guide rail 20. At the point of interaction of the secondary guideway, rail 20 physically curves away from the direction of the vehicle travel wherein the guidance control system detects an abnormal space variation between the vehicle and the rail causing the force field to increase in a proportional manner to maintain the same desired space relationship between guide rail 20 and vehicle force field 30 as shown in FIG. 3. As the vehicle 15 moves away from rail 18, due to the force of attraction between force field 30 and rail 20, the vehicle laterally slides across the extended width of suspension rail 14 provided along the point of switching, toward rail 20 as shown in FIG. 3. It is noted that once the vehicle moves by its attraction force from field 30, as hereinbefore described, the control system for force field 30 must constantly provide a sufficiently increasing force while maintaining the desired spaced relationship with regard to rail 20 to overcome the centrifugal force of the vehicle constantly moving it away from rail 20. When point 5—5 along guideway 12 is reached by the vehicle, the vehicle control guidance system and associated force field 26 is again activated providing normal guidance control over the vehicle as it continues in a straight path. As shown by FIG. 5, the guidance rails 18 and 22 as well as suspension rail 14 are rotated in their fixed spaced relationship with one another along the arcuate portion of the guidway 12 in a manner producing the banking of the vehicle thus canceling the centrifugal forces encountered by passengers while the vehicle is traveling along the arcuate portion of guideway 12.

If it should be desirable for the vehicle to continue traveling toward arrow 34, as shown in FIG. 1, rather than switched onto guideway 12, the supply power to force field 30 is removed so that the vehicle is not influenced toward rail 20. Vehicle force field 26 and the overhead suspension rail maintain sufficient guidance while momentum forces present maintain constant vehicle direction. When the vehicle is beyond the entrance to guideway 12, supply voltage is again restored to force field 30, thereby restoring the normal guidance controls.

The guidance system as described creates a minimum amount of vehicle drag between the force fields and its associated guide rail when guidance is required. When the vehicle is traveling in an ideal centered condition with respect to the guide rails, as shown in FIG. 2, the force fields exert no force on their associated rails thus removing all drag between the vehicle and its guide rails. The power to the magnetic force fields is controlled so as to provide force fields when guidance is needed and remove the power rendering the guidance system passive when no guidance is required.

If desirable, the guidance system may be modified by increasing the size and strength of the force fields and by the use of special rails to provide magnetic propulsion as well as guidance with the same magnetic force field system.

Thus, there has been described a new and novel method of switching a high speed surface vehicle having no physical contact with either suspension or guidance means.

While the invention has been explained and described with the air of particular embodiments thereof, it will be understood that the invention, is not limited thereby and many modifications retaining and utilizing the spirit thereof without departing essentially therefrom will occur to those skilled in the art in applying the invention to specific operation environments and conditions. It is therefore contemplated by the appended claims to cover all such modifications as fall within the scope and spirit of the invention.

What is claimed as new and useful and desired to be secured by U. S. Letters Patent is:

1. A switching and guiding system for a tracked high speed magnetically supported, guided, and propelled vehicle comprising, in combination, a vehicle, a plurality of rails including a support rail spaced above the vehicle out of contact therewith, first controllable magnetic means carried by the vehicle for supporting the same from said support rail and against the force of gravity thereon by magnetic attraction, means including the support rail and said magnetic means for transporting the vehicle along the rail, second and third guidance rails spaced on opposite sides of the vehicle out of contact therewith, second and third controllable magnetic means carried by the vehicle for respectively developing magnetic attraction and vehicle propulsion forces with respect to said second and third rails when the respective gaps between the second and third rails and the vehicle exceed a predetermined value, said rails having straight-a-way and branch sections defining a switching intersection at their junction, and means for selectively deactivating one of said second and third magnetizing means in relation to its associated rail section, thereby to continue movement of the vehicle along the straight-a-way rail section while the vehicle is passing through the intersection thereby to direct continued movement selectively along the straight-a-way or branch rail sections.

2. The switching and guiding system as in claim 1 wherein said support rail has a generally Y configuration with branches following said straight-a-way and rail branch sections.

3. The switching and guiding system as in claim 1 wherein said rails are banked in the portion of the branch rail section leading from the intersection.

4. The switching and guiding system as in claim 1 wherein said first controllable magnetic means produces a force field which is regulated at a level sufficient to counteract gravity and said second and third controllable means produce force fields independently of gravity and effective to exert no attractive force on their rails when said gaps have said pre-determined value.

* * * * *